US009568681B2

(12) United States Patent
Roussel et al.

(10) Patent No.: US 9,568,681 B2
(45) Date of Patent: Feb. 14, 2017

(54) CONNECTING UNIT WITH LATCH MECHANISM

(75) Inventors: Mathieu Roussel, Mascouche (CA); Eric Dudemaine, Crabtree (CA); Renaud Lavoie, Laval (CA)

(73) Assignee: EMBRIONIX DESIGN INC, Laval (CA)

( * ) Notice: Subject to any disclaimer, the term of this patent is extended or adjusted under 35 U.S.C. 154(b) by 511 days.

(21) Appl. No.: 13/606,110

(22) Filed: Sep. 7, 2012

(65) Prior Publication Data

US 2013/0094813 A1    Apr. 18, 2013

Related U.S. Application Data

(60) Provisional application No. 61/531,784, filed on Sep. 7, 2011.

(51) Int. Cl.
| | |
|---|---|
| *G02B 6/36* | (2006.01) |
| *G02B 6/38* | (2006.01) |
| *G02B 6/42* | (2006.01) |
| *H01R 13/62* | (2006.01) |
| *H01R 13/627* | (2006.01) |
| *H01R 13/516* | (2006.01) |

(52) U.S. Cl.
CPC ............... *G02B 6/36* (2013.01); *H01R 13/62* (2013.01); *H01R 13/6275* (2013.01); *G02B 6/3893* (2013.01); *G02B 6/4261* (2013.01); *G02B 6/4292* (2013.01); *H01R 13/516* (2013.01)

(58) Field of Classification Search
CPC ....... G02B 6/3893; G02B 6/36; G02B 6/4261; G02B 6/4292; H01R 13/6275; H01R 13/6271; H01R 13/6272
USPC ...................................... 385/88–94
See application file for complete search history.

(56) References Cited

U.S. PATENT DOCUMENTS 6,994,478 B1 *  2/2006  Chiu .................... G02B 6/4292
                                                         385/54
8,628,345 B2 *  1/2014  Hanson et al. ............... 439/353

* cited by examiner

*Primary Examiner* — John M Bedtelyon
(74) *Attorney, Agent, or Firm* — IP Delta Plus Inc

(57) ABSTRACT

The present disclosure relates to a connecting unit for for connecting with other connectors and/or with components. The connecting unit comprises a connector and a latch mechanism. The latch mechanism engages into a retaining member of an external component. Upon application of sufficient pressure on a disengaging part, the latch mechanism allows detaching the connecting unit from the external component.

13 Claims, 8 Drawing Sheets

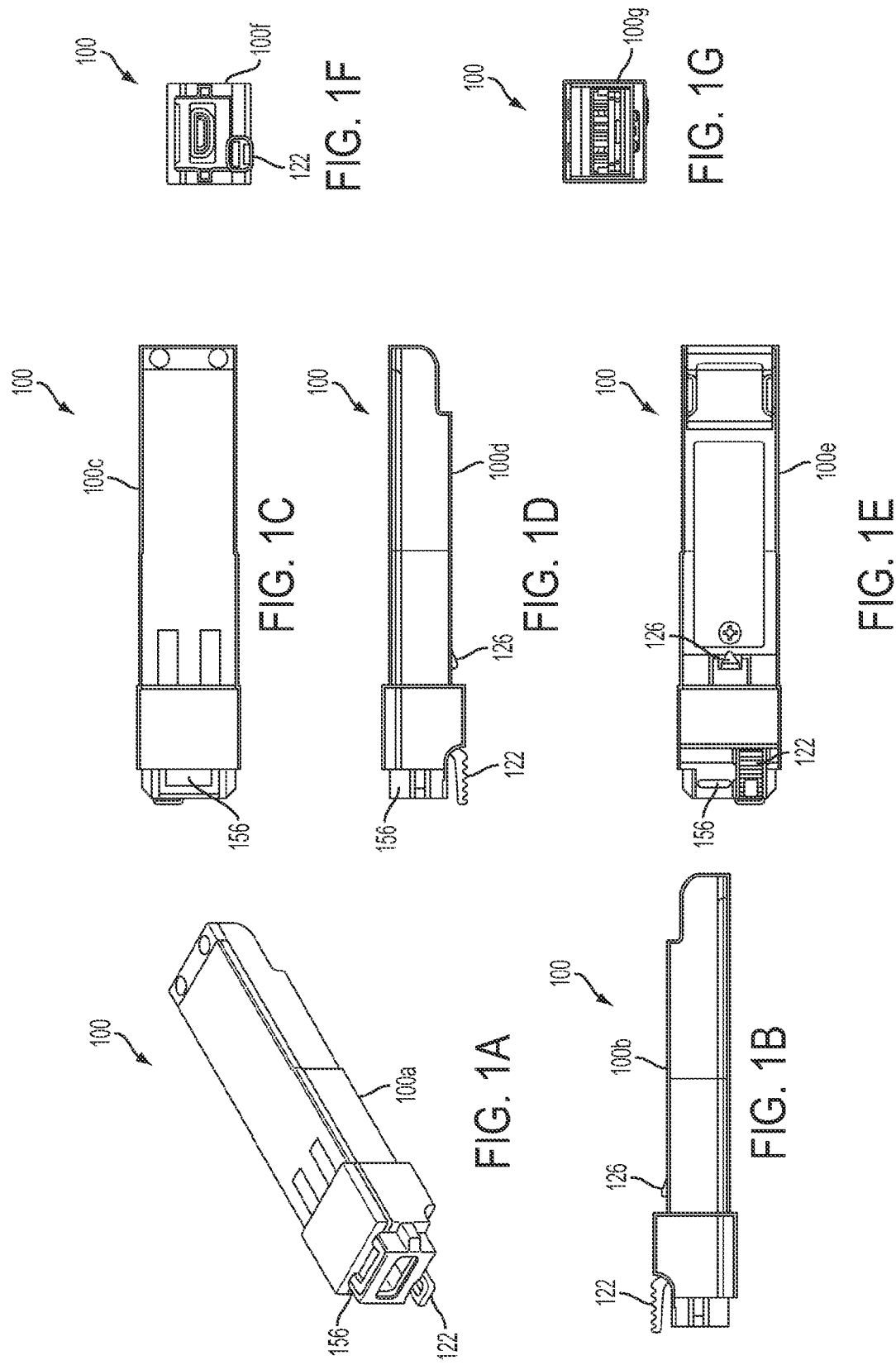

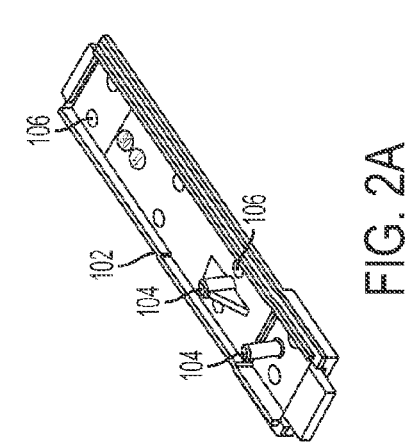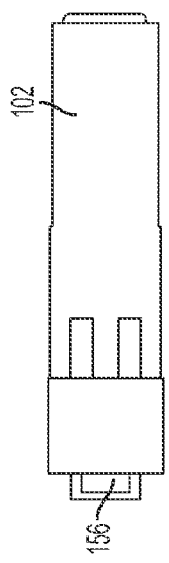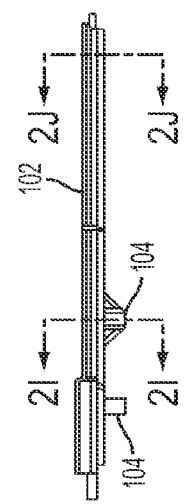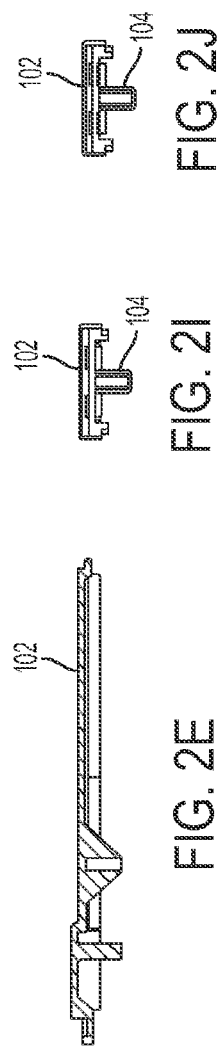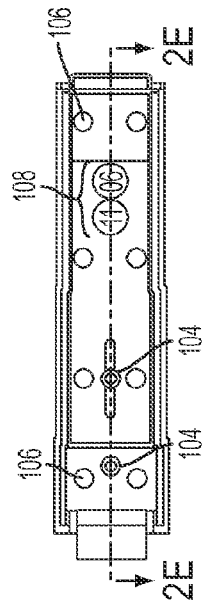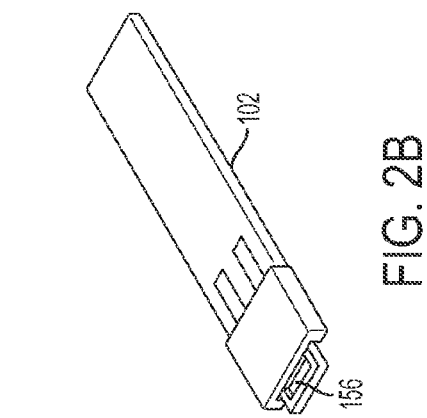

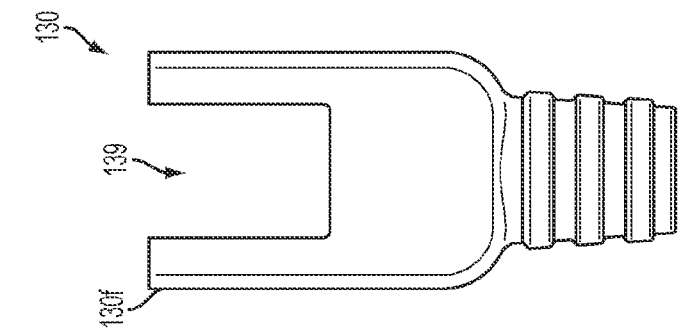
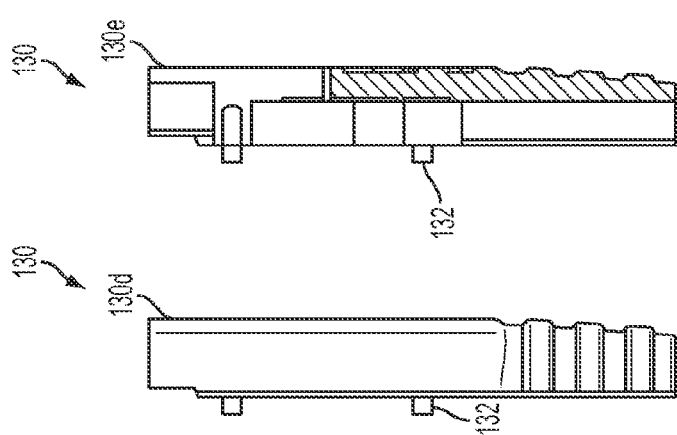
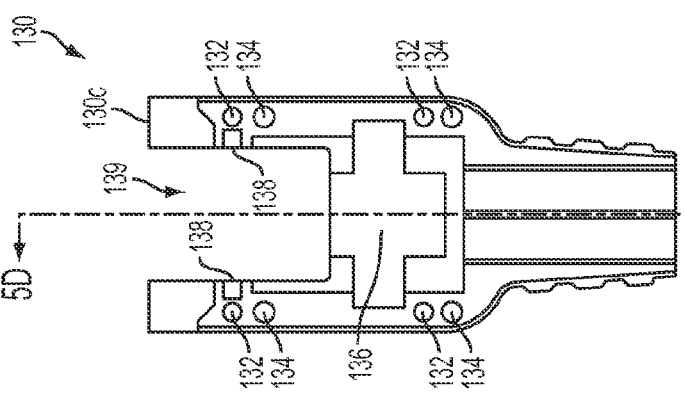
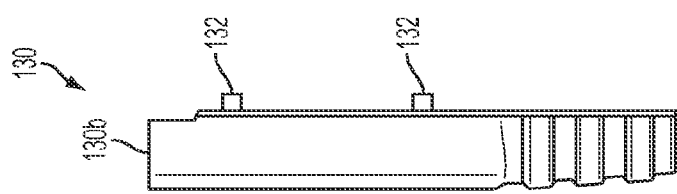
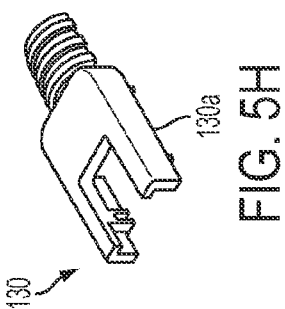
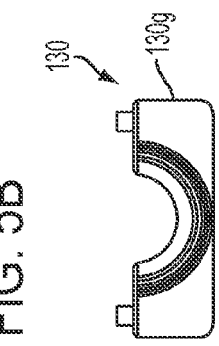

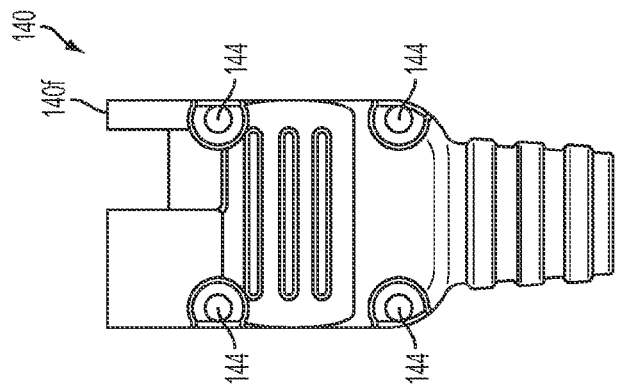
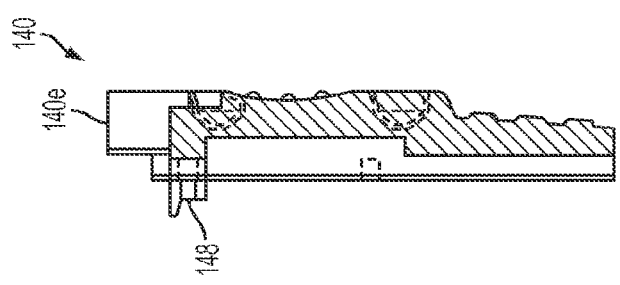
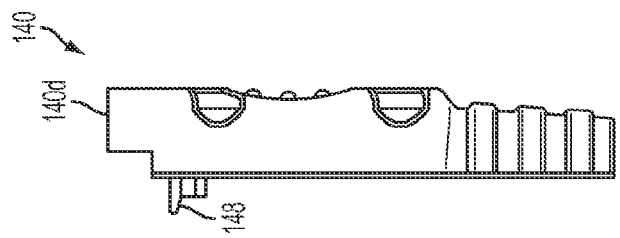
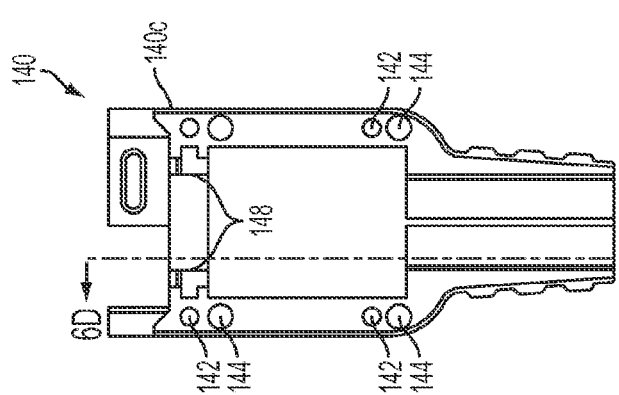
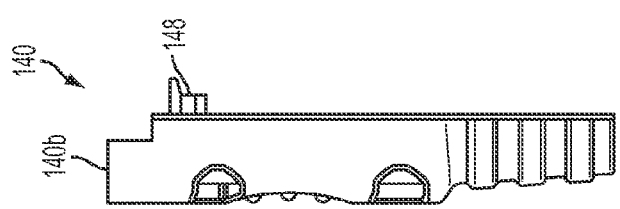
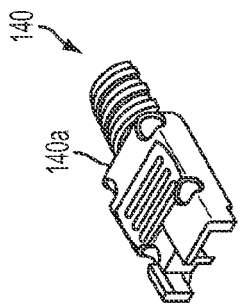
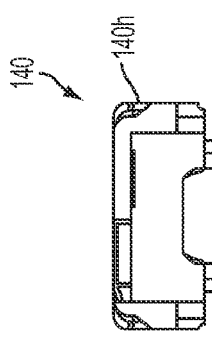
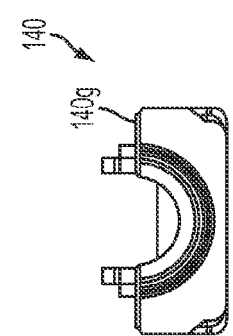

CONNECTING UNIT WITH LATCH MECHANISM

TECHNICAL FIELD

The present disclosure relates to the field of connectors. More specifically, the present disclosure relates to relates to a connecting unit with latch mechanism.

BACKGROUND

Current video distribution systems require cable interconnection capabilities that provide high density, reliability and ease of connection/disconnection.

Therefore, there is a need for connectors that can rapidly and safely be attached to or detached from small components.

SUMMARY

According to the present disclosure, there is provided a connecting unit comprising a casing adapted to receive a cable, a connector located within the casing and in electric or optic connection with the cable, and a latch mechanism mounted on the casing. The latch mechanism comprises an engaging extremity adapted to engage a retaining member of a component to which the connecting unit is to be connected. The latch mechanism also comprises a disengaging extremity and a resilient mechanism for resisting actuation of the disengaging extremity. Upon application of a pressure overcoming a resistance presented by the resilient mechanism on the disengaging extremity, the disengaging extremity engages pivotal movement of the engaging extremity, resulting in disengagement of the engaging extremity from the retaining member.

According to the present disclosure, there is also provided a connecting unit comprising a connector and a latch mechanism. The latch mechanism comprises an engaging extremity adapted to engage a retaining member of a component to which the connecting unit is to be connected. The latch mechanism also comprises a disengaging extremity and a resilient mechanism for resisting actuation of the disengaging extremity. Upon application of a pressure overcoming a resistance presented by the resilient mechanism on the disengaging extremity, the disengaging extremity engages pivotal movement of the engaging extremity, resulting in disengagement of the engaging extremity from the retaining member.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of a connecting unit with latch mechanism will be described by way of example only with reference to the accompanying drawings, in which:

FIG. 1 provides several views of a SFP cage adapted to receive a connecting unit with latch mechanism;

FIG. 2 is a series of detailed views of a SFP cage top adapted to receive an HDMI connecting unit with the present latch mechanism;

FIG. 5 depicts a series of detailed views of an HDMI connecting unit top booth;

FIG. 6 is a series of detailed views of an HDMI connecting unit bottom booth;

DETAILED DESCRIPTION

Figure 3I:
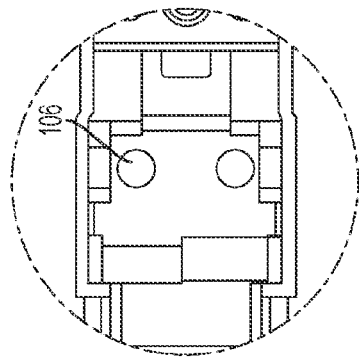
FIG. 3 is a series of detailed views of a SFP cage bottom adapted to receive an HDMI connecting unit with the present latch mechanism.
Figure 3L:
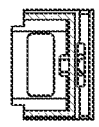
Figure 3M:
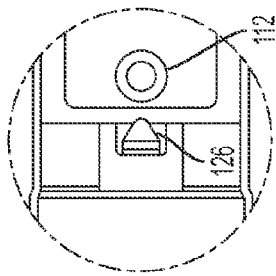
Figure 3J:
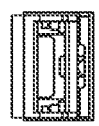
Figure 3B:
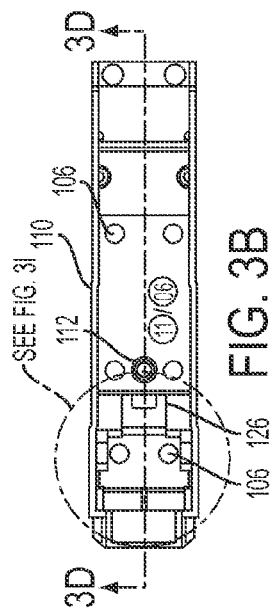
Figure 3C:
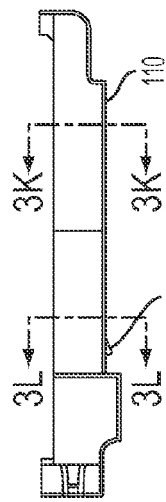
Figure 3D:
Figure 3E:
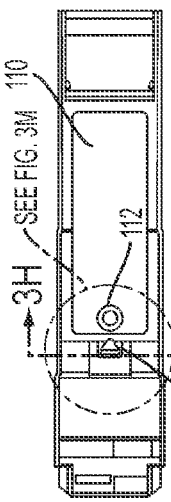
Figure 3A:
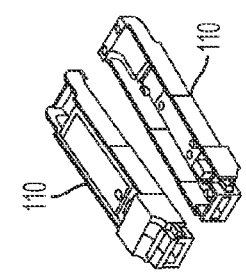
Figure 3F:
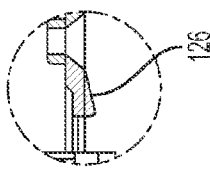
Figure 3G:
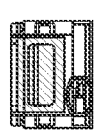
Figure 3H:
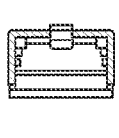
Figure 4B:
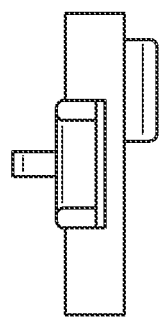
FIG. 4 depicts several views of an ejection mechanism.
Figure 4D:
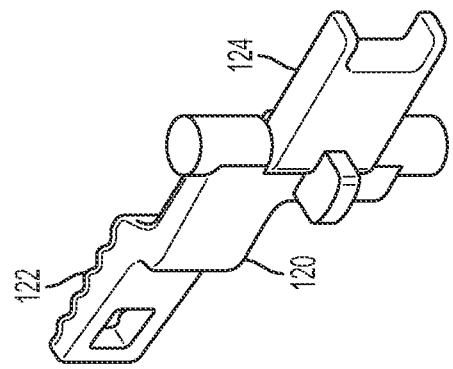
Figure 4A:
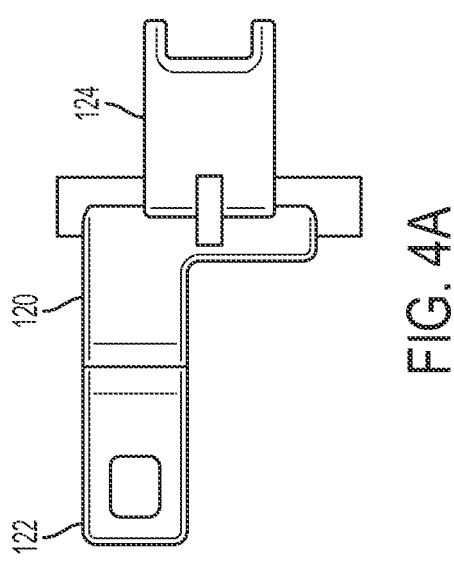
Figure 4C:
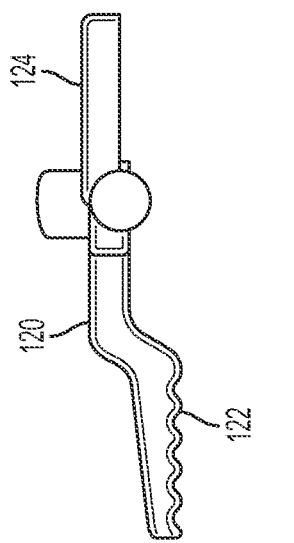

Like numerals represent like features on the various drawings.

Various aspects of the present disclosure generally address one or more connecting units with latch mechanisms. In a particular aspect, the present disclosure relates to a connecting unit with a latch mechanism for connecting with other connectors and/or with components. The present connecting unit with latch mechanism may be used with any type of electric/optic cable, electric/optic connector, and electric/optic component.

The following terminology is used throughout the present disclosure:
  Connecting unit: device or assembly for connecting other elements such as cables, modules, and the like.
  Connector: device for connecting other elements such as cables, modules, and the like.
  Casing: enclosing frame.
  Cable: assembly of electrical or optic conductors.
  Latch mechanism: mechanical device or assembly for attaching other devices.
  Retaining member: an attachment point.
  Resilient member: a body capable to recover is shape and size following deformation
  Pivotal movement:
  High Definition Multimedia Interface (HMDI): a standard interface for transfer of uncompressed audio/video information.
  Small Form-factor Pluggable (SFP): a standard for hot-pluggable telecommunication and data communication devices.

In an aspect, the present disclosure introduces a connecting unit installed on a connector that terminates a cable. However, the present connecting unit could equally be installed on a component adapted to receive a cable terminated with a connector, such as for example a SFP cage.

The connecting unit comprises a casing and a connector. The casing may be adapted for example to receive a cable, such as an electric or optic cable. The connector may consist of one or several connectors, either of the electric or optic type. An example of an electric connector is a HDMI connector. The connector directly or ultimately connects with the cable, via an electric of optic connection. The connector may be located within or in periphery of the casing. The connecting unit further comprises a latch mechanism mounted on the casing. The latch mechanism comprises an engaging extremity and a disengaging extremity.

Although the following description refers to HDMI connectors and to SFP cages, the present connecting unit with latch mechanism is not limited to such aspects. Reference to HDMI and SFP are for example only, and the present connecting unit may be used with any electrical or optic standard.

Referring now to the drawings, FIGS. 1 to 3 provide specification examples for a component that may connect with the present connecting unit. More particularly, FIGS. 1 to 3 depict various views of a SFP cage, providing a retaining member.

In more details, FIG. 1 provides several views of a SFP cage adapted to receive a connecting unit with latch mechanism. A SFP cage 100, adapted to receive a connecting unit with latch mechanism, is shown in a front perspective view (100a), a side elevation view (100b), a top view (100c), another side elevation view (100d), a bottom view (100e), a front elevation view (100f) and a rear elevation view (100g). Quotes, dimensions, and materials illustrated in this and in the following Figures are provided as examples only. The present connecting unit is not limited to such dimensions and materials.

FIG. 2 is a series of detailed views of a SFP cage top adapted to receive an HDMI connecting unit with the present latch mechanism. The SFP cage 100 comprises a top 102, which is readily visible in views 100a and 100c of FIG. 1. An underside of the top 102 shows threaded pins 104 for assembly of the top 102 with other components of the SFP cage 100. Ejectors 106 are also shown. Alphanumerical fields 108 show a part number and a manufacturing date of the SFP cage 100.

FIG. 3 is a series of detailed views of a SFP cage bottom adapted to receive an HDMI connecting unit with the present latch mechanism. The SFP cage 100 comprises a bottom 110, which is readily visible in view 100e of FIG. 1. The bottom 110 comprises a hole 112 configured to match the threaded pins 104 of the top 102, for assembly of the SFP cage 100, for example by means of screws (not shown).

FIG. 4 depicts several views of an ejection mechanism. An ejection mechanism 120 is in part inserted within the SFP cage 100, with a triggering end 122 protruding at the front of the SFP cage 100. A distal end 124 of the ejection mechanism 120 acts upon a latch 126, visible on FIGS. 1 and 3, for releasing the SFP cage 100 from a chassis (not shown). Operation of the ejection mechanism 120 and of the latch 126 is further described in U.S. application Ser. No. 13/081,862, the disclosure of which is incorporated herein in its entirety.

FIGS. 5 to 8 depict disassembled components of a connecting unit example. More specifically, FIG. 5 depicts a series of detailed views of an HDMI connecting unit top booth. Various views of a top booth 130 are provided, including a top perspective view 130a, a side elevation view 130b, a top cutaway view 130c, another side elevation view 130d, a cutaway side elevation view 130e, a top view 130f and a rear view 130g.

FIG. 6 is a series of detailed views of an HDMI connecting unit bottom booth. Various views of a bottom booth 140 are provided, including a perspective bottom view 140a, a side elevation view 140b, a top cutaway view 140c, another side elevation view 140d, a cutaway side elevation view 140e, a bottom view 140f, a rear view 140g and a front view 140h. Pins 132 of the top booth 130 are adapted to mate with recesses 142 of the bottom booth 140. Holes 144 allow insertion of screws (not shown) through the bottom booth 140 and into holes 134 of the top booth. Together, the HDMI connecting unit top booth 130 and bottom booth 140 form a casing configured to enclose a standard HDMI connector (not specifically shown) and to receive an HDMI Plug Lock (shown in a next Figure). In turn, the HDMI Plug Lock is configured to provide a solid attachment of the HDMI connector to the SFP cage 100.

Figure 7C:
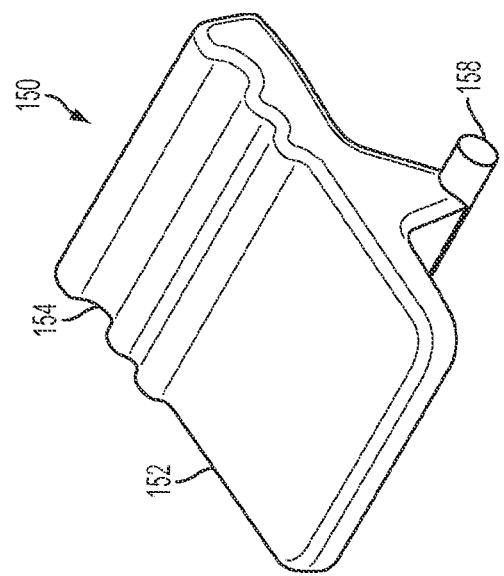
FIG. 7 depicts a series of views of an HDMI Plug Lock to be affixed to the HDMI connecting unit top booth of FIG. 5.
Figure 7B:
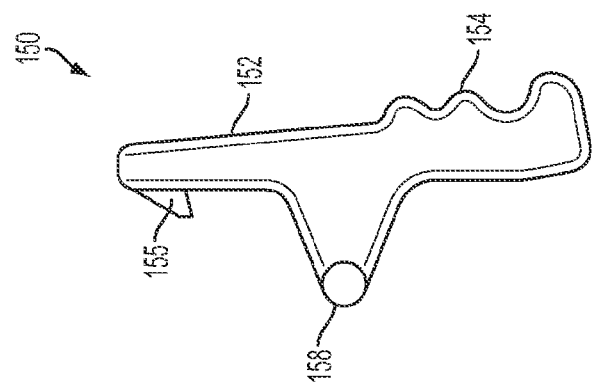
Figure 7A:
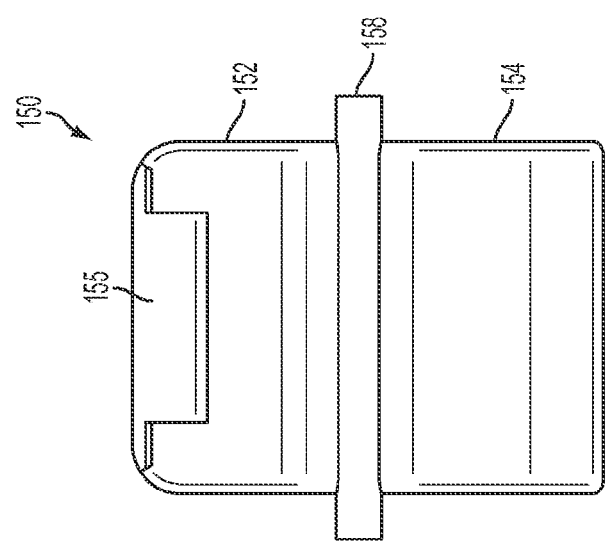

Reference is now made more particularly to FIG. 7, which depicts a series of views of an HDMI Plug Lock to be affixed to the HDMI connecting unit top booth of FIG. 5. A plug lock 150 comprises an engaging extremity 152 and disengaging extremity 154 embodied a single actuator. An axis 158 of the plug lock 150 is made to insert within slots 138 of the top booth 130. When the plug lock 150 is mounted to the top booth 130, the engaging extremity 152 is placed within a void 139 of the top booth 130. A bracket 148 of the bottom booth 140 maintains the axis 158 in place when the top and bottom booths are assembled. The engaging extremity 152 has a projection 155 adapted to engage a retaining member of a component to which the connecting unit is to be connected to. For example, in FIGS. 1 and 2, the retaining member is a lip 156 provided at the front of the top 102 of the SFP cage 100. However, the present connecting unit is not limited to operation with only such a retaining member. Many variants of retaining members could be used, without departing from the present connecting unit.

Figure 8B:
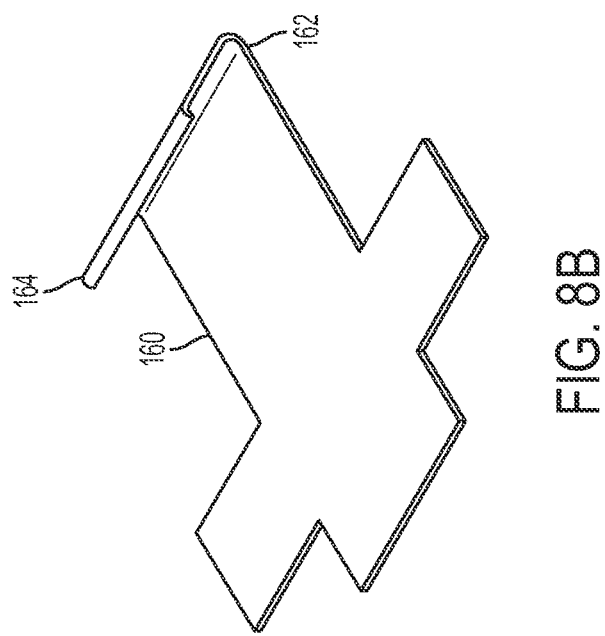
FIG. 8 depicts views of an HDMI Plug Spring to be used with the HDMI connecting unit top booth of FIG. 5 and with the HDMI Plug Lock of FIG. 7.
Figure 8A:
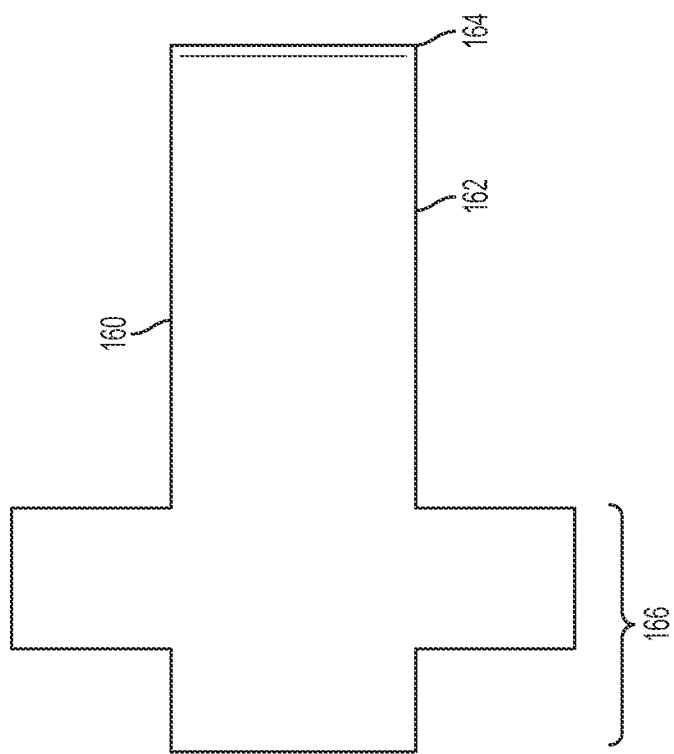

FIG. 8 depicts views of an HDMI Plug Spring to be used with the HDMI connecting unit top booth of FIG. 5 and with the HDMI Plug Lock of FIG. 7. A resilient mechanism 160, which is folded along lines 162 and 164, is configured to resist actuation of the disengaging extremity 154. A T-shaped end 166 of the resilient mechanism 160 is made to insert into a similarly shaped recess 136 within the top booth 130. Upon application on the engaging extremity 152 of a pressure sufficient to overcome a resistance presented by the resilient mechanism 160 on the disengaging extremity 154, the disengaging extremity 154 engages pivotal movement of the engaging extremity 152 around the axis 158, resulting in disengagement of the projection 155 of the engaging extremity 152 from the component to which the connecting unit is connected.

Those of ordinary skill in the art will realize that the description of the connecting unit with latch mechanism are illustrative only and are not intended to be in any way limiting. Other embodiments will readily suggest themselves to such persons with ordinary skill in the art having the benefit of the present disclosure. Furthermore, the disclosed connecting unit may be customized to offer valuable solutions to existing needs and problems of connecting electric/optic cables, electric/optic connectors, and electric/optic components.

In the interest of clarity, not all of the routine features of the implementations of the connecting unit are shown and described. It will, of course, be appreciated that in the development of any such actual implementation of the connecting unit, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of connectors having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A connecting unit comprising:
a casing adapted to receive a cable;
a connector in electric or optic connection with the cable, the connector being located within the casing; and
a latch mechanism mounted on the casing, comprising:
an engaging extremity comprising a projection adapted to engage a retaining member of a component to which the connecting unit is to be connected,
a disengaging extremity,
a pivotal axis substantially centrally positioned between the engaging extremity and the disengaging extremity, and
a resilient mechanism for resisting actuation of the disengaging extremity, the resilient mechanism comprising a first end having a shape adapted for insertion into a complimentary shaped recess of the connecting unit, the resilient mechanism further comprising a deformable second end configured to resist actuation of the disengaging extremity,
whereby, upon application of a pressure overcoming a resistance presented by the deformable second end of the resilient mechanism on the disengaging extremity, the disengaging extremity engages pivotal movement of the engaging extremity around the pivotal axis resulting in disengagement of the engaging extremity from the retaining member.

2. The connecting unit of claim 1, wherein the connector is a high definition multimedia interface connector.

3. The connecting unit of claim 1, wherein the engaging extremity is adapted to engage the retaining member of a small form-factor pluggable cage.

4. The connecting unit of claim 1, wherein the first end of the resilient mechanism and the similarly shaped recess of the connecting unit are T-shaped.

5. The connecting unit of claim 1, wherein the deformable second end of the resilient mechanism is folded with respect to the first end of the resilient mechanism.

6. A connecting unit comprising:
a connector; and
a latch mechanism comprising:
an engaging extremity comprising a projection adapted to engage a retaining member of a component to which the connecting unit is to be connected,
a disengaging extremity,
a pivotal axis substantially centrally positioned between the engaging extremity and the disengaging extremity, and
a resilient mechanism for resisting actuation of the disengaging extremity, the resilient mechanism comprising a first end having a shape adapted for insertion into a complimentary shaped recess of the the connecting unit, the resilient mechanism further comprising a deformable second end configured to resist actuation of the disengaging extremity;
whereby, upon application of a pressure overcoming a resistance presented by the deformable second end of the resilient mechanism on the disengaging extremity, the disengaging extremity engages pivotal movement of the engaging extremity around the pivotal axis resulting in disengagement of the engaging extremity from the retaining member.

7. The connecting unit of claim 6, wherein the connector is a high definition multimedia interface connector.

8. The connecting unit of claim 6, wherein the engaging extremity is adapted to engage a retaining member of another connector unit.

9. The connecting unit of claim 6, wherein the connecting unit is installed on a small form-factor pluggable cage.

10. The connecting unit of claim 6, wherein the first end of the resilient mechanism and the similarly shaped recess of the connecting unit are T-shaped.

11. The connecting unit of claim 6, wherein the deformable second end of the resilient mechanism is folded with respect to the first end of the resilient mechanism.

12. A connecting unit for insertion within an SFP cage, the connecting unit comprising:
a casing adapted to receive a cable;
a connector in electric or optic connection with the cable, the connector being located within the casing; and
an actuator mounted to the casing, the actuator comprising:
an engaging extremity comprising a projection adapted to engage the SFP cage in which the connecting unit is inserted,
a disengaging extremity,
a pivotal axis substantially centrally positioned between the engaging extremity and the disengaging extremity, and
a resilient mechanism for resisting actuation of the disengaging extremity, the resilient mechanism comprising a first end having a shape adapted for insertion into a complimentary shaped recess of the SFP cage, the resilient mechanism further comprising a deformable second end configured to resist actuation of the disengaging extremity,
whereby, upon application of a pressure overcoming a resistance presented by the deformable second end of the resilient mechanism on the disengaging extremity, the disengaging extremity engages pivotal movement of the engaging extremity around the pivotal axis resulting in disengagement of the engaging extremity from the retaining member.

13. The connecting unit of claim 12, wherein the connector is a high definition multimedia interface connector.

* * * * *